No. 746,428. PATENTED DEC. 8, 1903.
C. D. WINNE.
ATTACHMENT FOR BROOMS.
APPLICATION FILED JUNE 22, 1903.
NO MODEL.

Witnesses
E. C. F. Stewart
C. N. Woodward.

Cora D. Winne, Inventor.
by C. A. Snow & Co
Attorneys

No. 746,428. Patented December 8, 1903.

UNITED STATES PATENT OFFICE.

CORA D. WINNE, OF CHERRY VALLEY, NEW YORK.

ATTACHMENT FOR BROOMS.

SPECIFICATION forming part of Letters Patent No. 746,428, dated December 8, 1903.

Application filed June 22, 1903. Serial No. 162,668. (No model.)

*To all whom it may concern:*

Be it known that I, CORA D. WINNE, a citizen of the United States, residing at Cherry Valley, in the county of Otsego and State of New York, have invented a new and useful Attachment to Brooms, of which the following is a specification.

This invention relates to brooms, more particularly "whisk" or brush brooms, and has for its object to provide an attachment to assist in removing adhering particles which will not yield to the bristles or broom-corn end of the implement; and the invention consists in a scraper attachment in the form of a laterally-extending cap connected to the free end of the broom-handle.

The invention further consists in an attachment in the form of a laterally-extended cap having a ferrule engaging the free end of the broom-handle whereby the scraper-cap is adapted for attachment to the handle.

Other novel features of the invention will appear in the annexed description and be pointed out in the claim following.

Figure 1:
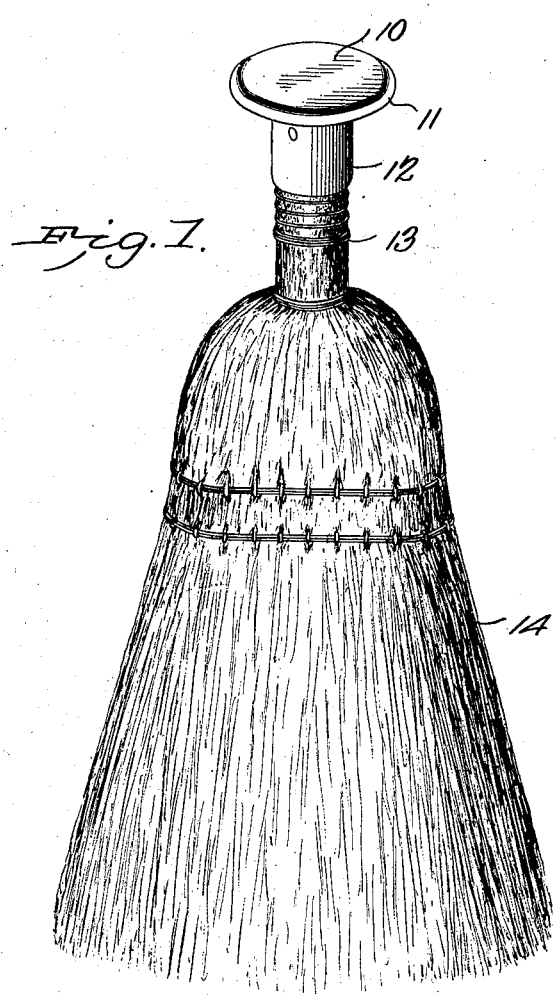
Figure 2:
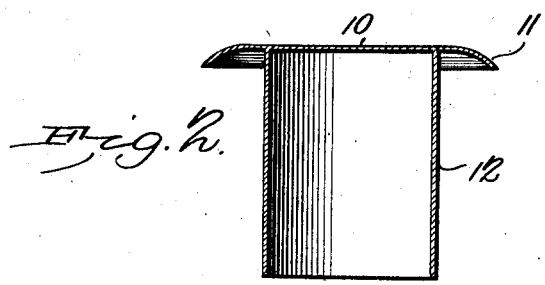

In the drawings illustrative of the invention, in which corresponding parts are denoted by like designating characters, Figure 1 is a perspective view of a whisk or brush broom with the improved attachment applied. Fig. 2 is a sectional side elevation of the device detached.

The improved device may be attached to any form of brush or broom provided with a handle member, but is more particularly applicable to ordinary whisk or brush brooms and for the purpose of illustration is thus applied.

The improved device consists of a scraper 10, preferably in disk form, with its rim curved downward, as shown at 11, and provided with a ferrule 12, extending centrally from the disk, the ferrule adapted to inclose the outer end of the handle 13 of the broom 14, as shown. The curved rim 11 of the disk thus extends laterally from all sides of the handle and ferrule and not only forms an effective scraper to assist in removing adhering particles which will not readily yield to the action of the brush portion 14, but also serves as a cap or finish to the handle member, while the ferrule portion 12 materially assists in supporting the handle and prevents it from splitting when applied to wooden handles; but when applied to whisk-brooms wherein the handle portion is covered with the "broom-corn" extended and secured by wiring the ferrule protects the corn material and wiring and effectually prevents its displacement or abrasion. The ferrule and scraper thus perform several important functions and add materially to the efficiency and value of the implement.

The device will preferably be of sheet metal of proper thickness and may be pressed or otherwise formed into the required shape. The scraper member extending uniformly from all sides will not require the brush or broom to be adjusted to any required position before using, but is ready for use no matter which side may be presented to the matter to be treated. Another advantage of the projecting scraper member is that it supports the broom in position to be more readily grasped by the hand when lying upon a flat surface.

Having thus described the invention, what I claim is—

A broom attachment comprising a single-piece structure in the form of a ferrule having one end thereof closed by a disk with the edges of the disk projected beyond the body of the ferrule forming a peripheral flange.

In testimony that I claim the foregoing as my own I have hereto affixed my signature in the presence of two witnesses.

CORA D. WINNE.

Witnesses:
LEONARD DAKIN,
ALVA S. PEARSON.